United States Patent
Thubert et al.

(10) Patent No.: US 10,725,948 B2
(45) Date of Patent: Jul. 28, 2020

(54) ROCE OVER WIRELESS

(71) Applicant: Cisco Technology, Inc., San Jose, CA (US)

(72) Inventors: Pascal Thubert, La Colle sur Loup (FR); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 78 days.

(21) Appl. No.: 16/163,528

(22) Filed: Oct. 17, 2018

(65) Prior Publication Data

US 2020/0125511 A1 Apr. 23, 2020

(51) Int. Cl.
*G06F 13/28* (2006.01)
*H04W 74/08* (2009.01)
*G06F 15/173* (2006.01)

(52) U.S. Cl.
CPC ........ *G06F 13/28* (2013.01); *G06F 15/17331* (2013.01); *H04W 74/08* (2013.01)

(58) Field of Classification Search
None
See application file for complete search history.

(56) References Cited

U.S. PATENT DOCUMENTS

| | | | | |
|---|---|---|---|---|
| 8,989,180 B2 * | 3/2015 | Pandit | ...................... | G06F 13/28 370/389 |
| 9,112,632 B2 * | 8/2015 | Finn | ........................ | H04L 47/50 |
| 9,558,146 B2 * | 1/2017 | Sharp | ..................... | G06F 15/167 |
| 9,747,249 B2 * | 8/2017 | Cherian | .................. | H04L 45/64 |
| 9,813,338 B2 * | 11/2017 | Sajeepa | ................. | H04L 45/745 |
| 2012/0106328 A1 * | 5/2012 | Gan | .................... | H04N 21/2662 370/230 |
| 2014/0092918 A1 * | 4/2014 | Jost | ....................... | H04J 3/0697 370/465 |

OTHER PUBLICATIONS

Wikipedia, "RDMA over converged Ethernet" Oct. 14, 2018; accessed <https://en.wikipedia.org/w/index.php?title=RDMA_over_Converged_Ethernet&oldid=864061254> (Year: 2018).*

(Continued)

*Primary Examiner* — Thomas J Dailey
(74) *Attorney, Agent, or Firm* — Patterson + Sheridan, LLP

(57) ABSTRACT

A wireless device can achieve higher predictability for its transmissions by inserting a placeholder frame in a transmission queue before RoCE data has been received. In addition, a contention countdown associated with the placeholder frame can start before the RoCE data is ready for transmission. Once the RoCE data is available, the device can insert the data into the payload of the placeholder frame, thereby reducing the wait time before the RoCE data can be transmitted wirelessly. Additionally, the device can improve reliability by transmitting RoCE data using multiple subcarrier RUs in a channel. The data blocks and the duplicative data can be transmitted in parallel using the subcarrier RUs. If a subset of the subcarrier RUs are blocked because of narrowband interference, the receiving device can nonetheless recover the data blocks and reconstruct the RoCe packet from the data transported on the RUs that did not have interference.

20 Claims, 5 Drawing Sheets

(56) References Cited

OTHER PUBLICATIONS

Lee, Bill et al, "11 Myths about RDMA over Converged Ethernet (RoCE)", Sep. 5, 2017, Electronic Design, accessed <https://www.electronicdesign.com/industrial-automation/article/21805527/11-myths-about-rdma-over-converged-ethernet-roce> (Year: 2017).*

Zhu et al., "Congestion Control for Large-Scale RDMA Deployments," SIGCOMM '15, Aug. 17-21, 2015, 14 pages.

Liu et al, "Implementation of PFC and RCM for RoCEv2 Simulation in OMNeT++," Proceedings of the OMNeT++ Community Summit 2015I, 4 pages.

* cited by examiner

ROCE OVER WIRELESS

TECHNICAL FIELD

Embodiments presented in this disclosure generally relate to providing a reliable and deterministic data transfer for remote direct memory access (RDMA) over a Converged Ethernet (RoCE) using wireless.

BACKGROUND

RoCE is a protocol where a chunk of memory (e.g., random access memory (RAM)) is transferred over a wire transparently to a central processing unit (CPU) as a direct interaction between the memory and a network interface card (NIC). RoCE expects a very low latency network since it is a Direct Memory Access (DMA) (i.e., does not require the use of the CPU) and is highly sensitive to data loss. For example, even a low rate of loss can still lead to a livelock where the communication link is fully utilized, but because of loss, the chunk of memory cannot be recovered at the receiver.

Currently, there are two RoCE versions: RoCE v1 and RoCE v2. RoCE v1 is an Ethernet link layer protocol and allows communication between any two hosts in the same Ethernet broadcast domain. RoCE v2 (and future version RoCE v4) is an internet layer protocol which means that RoCE v2 packets can be routed through a network. However, adapting RoCE v1 or RoCE v2 to include a wireless link is difficult since these protocols require quasi deterministic transport and very low loss.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a wireless device that includes a transmission queue configured to store a plurality of frames for transmission using a wireless medium and a remote direct memory access (RDMA) over a Converged Ethernet (RoCE) manager. The RoCE manager is configured to preemptively insert a placeholder frame into the transmission queue, instruct the transmission queue to start a contention countdown corresponding to the placeholder frame, and upon receiving RoCE data, insert the RoCE data into the placeholder frame, wherein the contention countdown has already started.

Example Embodiments

The embodiments herein provide deterministic and reliable data transfer when using wireless links (e.g., Wi-Fi®) to transmit RoCE packets. Thus, rather than used only a wired network, RoCE packets can be transmitted between computing devices over a wireless communication network. As such, DMA can be performed between devices coupled via a Wi-Fi network.

In one embodiment, a RoCE manager can achieve higher predictability by inserting a placeholder frame in a transmission queue before the RoCE data has been received. That is, before the RoCE frame is ready for transmission on a wireless network, the RoCE manager inserts a placeholder frame (or a shadow frame) into the transmission queue which reserves a position for the received RoCE data in the queue. In addition, a contention number is picked, is associated to the placeholder frame, and contention countdown starts before the RoCE data is ready for transmission. The contention countdown may be part of an inter-frame spacing associated with the placeholder frame. Once the RoCE data is available, the RoCE manager inserts the data into the payload of the placeholder frame, which was previously empty or null. Because the contention countdown has already started and the placeholder frame is already in the transmission queue, the latency in transmitting the RoCE data is reduced, thereby achieving higher predictability for its transmissions of the RoCE wireless link.

In another embodiment, the RoCE manager can improve reliability by transmitting RoCE data using multiple subcarrier resource units (RUs) in a Wi-Fi channel. For example, the RoCe manager may chunk up the RoCE data into different data blocks or fragments and create at least partially duplicative data from the fragments using a coding scheme. The data blocks and the duplicative data can be transmitted in parallel using the multiple subcarrier RUs. If a subset of the sub-carrier RUs are blocked because of narrowband interference, the receiving device can nonetheless recover the data blocks and reconstruct the RoCe packet from the data transported on the RUs that did not have interference. In addition, the RoCE manager can change the selected subcarrier RUs to avoid narrowband interference. In this manner, the RoCE manager can improve reliability when using a wireless medium to transmit RoCE data.

Figure 1:
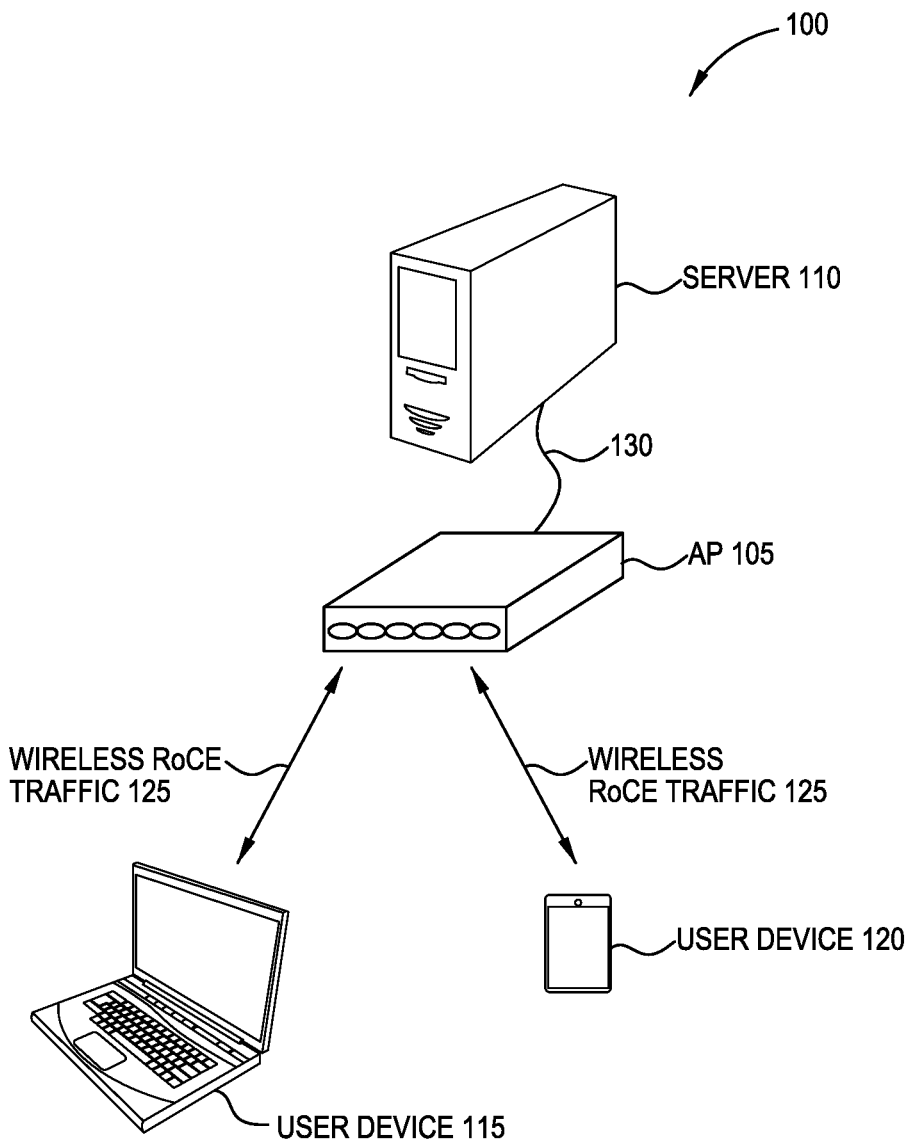
FIG. 1 illustrates a RoCE communication system that includes a wireless link, according to one embodiment described herein.

FIG. 1 illustrates a RoCE communication system 100 that includes a wireless link, according to one embodiment described herein. In one embodiment, an access point (AP) 105 establishes a Wi-Fi network with user devices 115 and 120. In addition, the AP 105 has a wired connection 130 to a server 110. In one embodiment, the Wi-Fi network is used to transmit wireless RoCE traffic 125 between the user devices 115 and 120 and the AP 105. For example, the user device 115 may use DMA to retrieve data from memory in the server 110. Using the RoCE protocol, the data may be transmitted from the server 110 to the AP 105 using the wired connection 130 and then to the user device 115 as wireless RoCE traffic 125. For example, the user device 115 can transmit a DMA read request for a portion of memory in the server 110. In response, the server 110 can output RoCE packets containing the requested data (without using a CPU in the server 110) to the AP 105. As discussed below, the AP 105 can transmit the data in the RoCE packets as wireless RoCE traffic 125 to the requesting user device 115. Of course, the process can work in reverse where the user device 115 transmits RoCE data to the server 110 via the AP 105. In another example, RoCE can be used to perform a DMA read or write between the user devices 115 and 120 using the AP 105 as an intermediary.

Although the RoCE protocol benefits from the characteristics of a converged Ethernet network, the protocol can also be used on a traditional or non-converged Ethernet network. Further, the embodiments herein are not limited to RoCE v2 but can be applied to RoCE v1 as well as potentially future RoCE versions.

Figure 2:
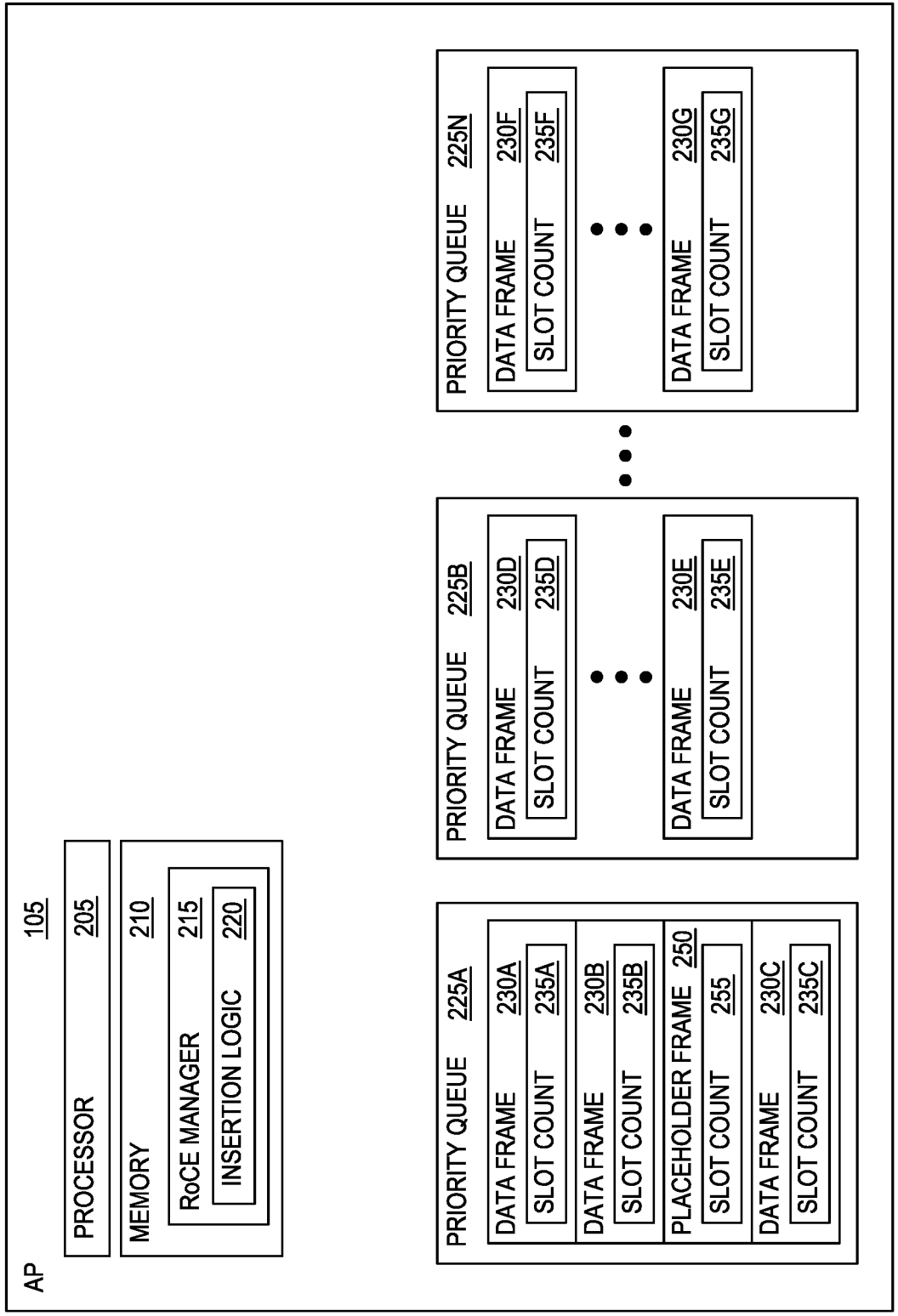
FIG. 2 illustrates an access point with priority queues for transmitting wireless RoCE frames, according to one embodiment described herein.

FIG. 2 illustrates the AP 105 with priority queues 225 for transmitting wireless RoCE frames, according to one embodiment described herein. As shown, the AP 105 includes a processor 205 and memory 210. The processor 205 can represent any number of network processing elements which can include any number of cores. The memory 210 can include volatile and non-volatile memory elements. Moreover, the memory 210 includes a RoCE manager 215 which is shown as a software application. However, in other embodiments, the RoCE manager 215 may be implemented using firmware, hardware, or combinations thereof.

In one embodiment, the RoCE manager 215 inserts placeholder frames 250 into one or more of the priority queues 225 in anticipation of receiving RoCE data that should be transmitted wirelessly to an external device (e.g., the user devices illustrated in FIG. 1). In one embodiment, the placeholder frame 250 does not include a payload or has a null or empty payload. Later, when the RoCE data is received, the RoCE manager 215 can insert the data into the payload of the placeholder frame 250. Meanwhile, the placeholder frame 250 can reserve a place in the queue for the RoCE data. When the RoCE packet is frame is ready, the packet can use the placeholder frame 250 rather than inserting a new frame into the transmission queue. Thus, the RoCE packet can start the contending process for the wireless network before the actual data is available from upper layers in the stack.

The placeholder frame 250 can include a slot count 255 in the IFS which dictates a minimum of time the frame 250 waits (e.g., a contention countdown) before being transmitted wirelessly. For example, the slot count 255 could be the result of the Arbitration Inter-Frame Space Number (AIFSN) and Enhanced Distributed Channel Access (EDCA) access procedure, or the result of arbitration inter-frame spacing (AIFS) which shortens or expands the period a wireless node (e.g., the AP 105) has to waft before it is allowed to transmit its next frame. However, the slot count 255 is not limited to such and can represent durations of other types of inter-frame spaces such as PCF inter-frame space, DCF inter-frame space, HCF Controlled Channel Access, etc.

When the RoCE manager 215 inserts the placeholder frame 250 into the queue, the slot count 255 can begin. Thus, when the RoCE data is received, the slot count 255 has already reduced (or expired) which means the RoCE frame (i.e., the placeholder frame 250 with the RoCE data in its payload) waits less time relative to placing the RoCE frame in the queue and starting the slot count 255 after the RoCE data has been received. In this manner, the placeholder frame 250 can achieve higher predictability when transmitting RoCE data wirelessly by reducing the latency associated with sending the wireless frames.

In this example, the AP 105 includes multiple priority queues 225 which have different priorities. For example, the priority queue 225A may be used to store lower priority data frames 230 than the priority queues 225B which in turns has a lower priority than priority queue 225N. In one embodiment, priority queues 225 are access categories which store different types of data. For example, according to IEEE 802.11, there can be four access categories (AC): AC background (AC_BK), AC Best Effort (AC_BE), AC Video (AC_VI), and AC Voice (AC_VO) where AC_BK stores the lowest priority data and AC_VO stores the highest priority data. However, the embodiments herein are not limited to any particular Quality of Service (QoS) technique for prioritizing the transmission priority queues 225.

In one embodiment, the slot count 235 for the data frames 230 is set depending on the type of data in the frame—i.e., what queue 225 stores the data frame 230. For example, if the data frame 230 is in the priority queue 225A, the slot count 235 may be assigned by selecting a random number for a first range that is larger than a second range used to assign the slot count 235 for a frame 230 in the priority queue 225B. As a result, the slot counts 235 for the frames 230 in the priority queue 225A are on average longer than the counts 235 for the frames 230 in the priority queue 225B. Similarly, a third range used to assign a slot count 235 for data frames 230 in the priority queue 225N may be smaller than the second range used by frames 230 in the priority queue 225B. Because the slot counts 235 become generally smaller as the range of numbers that can be randomly selected is decreased, this means the frames 230 in the higher priority queues 225 are more likely to be transmitted sooner than the frames 230 in the lower priority queues 225.

In one embodiment, each of these queues 225 contends for the same wireless channel, with each of the queues 225 using different inter-frame space range for selecting the values of the slot counts 235. If more than one frame from different queues 225 (or access categories) collide internally, the frame 230 with the higher priority is sent, and the lower priority frame adjusts its backoff parameters as though it had collided with a frame external to the queuing mechanism.

Although FIG. 2 illustrates the placeholder frame 250 in the priority queue 225A, as discussed below, the RoCE manager 215 may place the frame 250 in any of the queues. Further, while one frame 250 is shown, in other embodiments, there may be multiple placeholder frames 250 in the same queue 225 or in multiple queues 225. For example, the AP 105 may be servicing multiple streams of RoCE traffic, and thus, generate a placeholder frame 250 for each of those streams. Or the number of placeholder frames may change depending on the amount of RoCE data a stream is expected to generate.

In one embodiment, the RoCE manager 215 may negotiate a larger portion of the priority queue 225 (or more generally, the protocol or network stack) for the RoCE data by using an ADD Block Acknowledgement (ADDBA) and a Delete Block Acknowledgement (DELBA). The ADDBA instructs the AP 105 to store a block of frames in the stack. This enables the received RoCE data to be stored in multiple placeholder frames 250 which has the advantage discussed above where the contention process begins before the RoCE data is ready for transmission.

While shown as being part of the AP 105, the elements and components illustrated in FIG. 2 can also be applied to the user device for transmitting wireless RoCE data to the AP 105.

Figure 3:
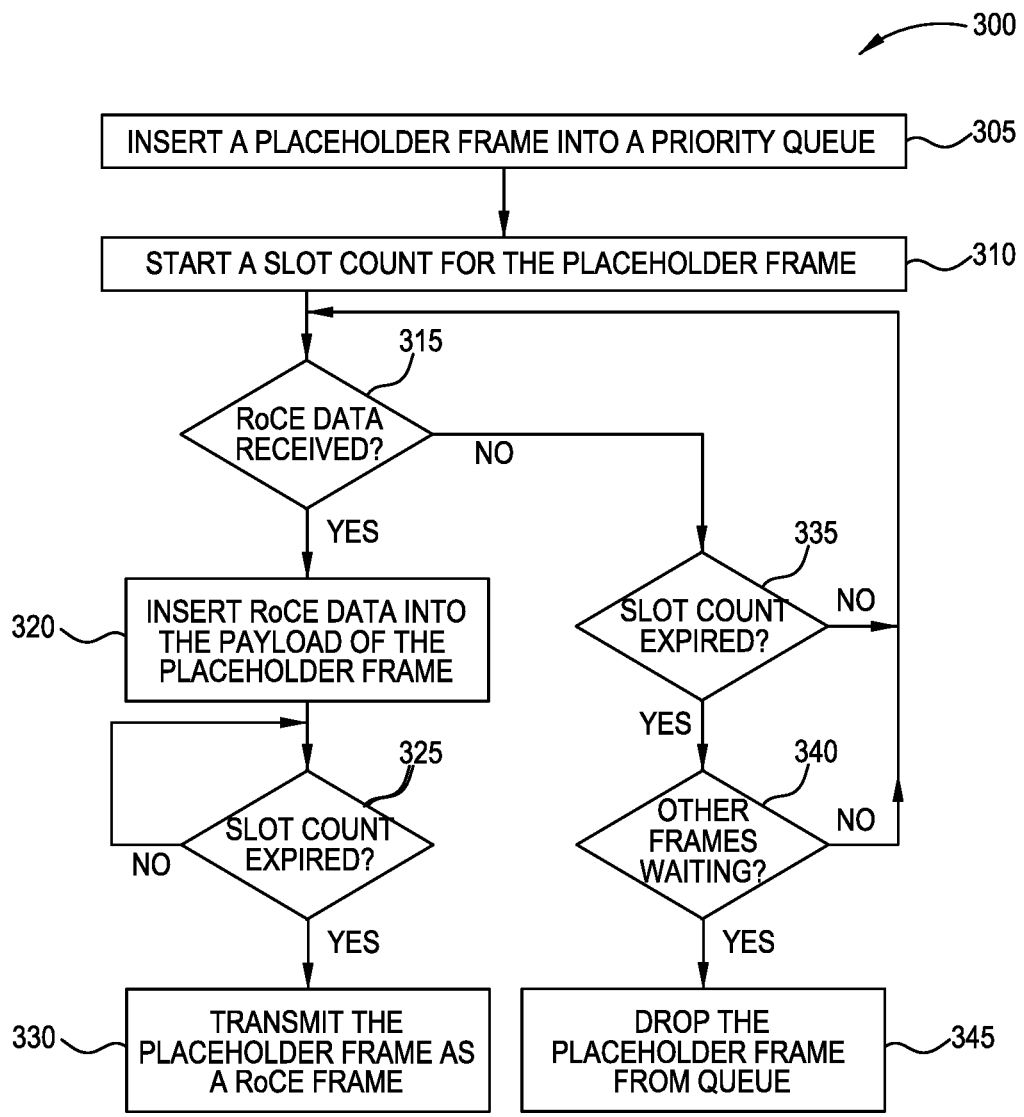
FIG. 3 is a flowchart for inserting a placeholder frame into a priority queue, according to one embodiment described herein.

FIG. 3 is a flowchart of a method 300 for inserting a placeholder frame into a priority queue, according to one embodiment described herein. At block 305, the RoCE manager inserts a placeholder frame in a priority queue. In one embodiment, the RoCE manager inserts the placeholder according to a ratio. For example, for every three data frames inserted in the queue, the manager inserts a placeholder frame. The RoCE manager may adjust the ratio to assure that a RoCE frame can be sent within a maximum time window—i.e., the maximum time a ready-to-send RoCE frame waits before it is wireless transmitted. For example, for longer time windows, the ratio can be increased to inserting a placeholder frame for every five data frames to ensure the RoCE frame is sent within the maximum time window. Moreover, the RoCE manager can adjust the ratio depending on congestion in the AP or user device, or depending on the number of RoCE data streams. For example, if an AP is servicing several RoCE data streams between multiple devices, the RoCE manager may increase the ratio at which it inserts the placeholder frames into the transmission queue so that there are enough frames for the RoCE streams. In this manner, the number of placeholder frames inserted in the transmission queue can change dynamically depending on the congestion from other data traffic and the amount of RoCE data being sent.

If the AP or user device includes multiple transmission queues (e.g., multiple priority queues or access categories with different priorities), the RoCE manage can select which one of the queues to insert the placeholder frame depending on congestion. This is discussed below in the flowchart illustrated in FIG. 4.

In one embodiment, the RoCE manager inserts the placeholder frame into the transmission queue in response to receiving a DMA read. For example, the AP may receive a DMA read request from a first device which it forwards to a second device. Because a DMA read typically results in RoCE data being received from the second device to be forwarded to the first device, the RoCE manager can insert the placeholder frame (or multiple placeholder frames) into the queue in anticipation of receiving RoCE data from the second device. In one embodiment, the RoCE manage may insert the placeholder frame immediately into the queue after receiving a DMA read, or can wait a period of time (since it may take several milliseconds for the second device to fetch the RoCE data) before inserting the placeholder frame.

At block 310, the transmission queue starts a slot count for the placeholder frame. As mentioned above, the slot count can be any count used in a contention process to provide access to a wireless medium. In one embodiment, the slot count may be a random number assigned from a range of numbers. Further, the size of the range of numbers may differ depending on which queues the placeholder frame is inserted. A higher priority queue may use a smaller range which means, on average, the contention countdown defined by the slot count has a smaller value than slot counts for a lower priority queue that uses a larger range of values.

Stated differently, the total wait time is smaller than the wait time for a lower priority queue that uses a larger range of values After the slot count is assigned, the transmission queue begins to countdown the value to zero. For example, the slot count may have a value of seven slots which the transmission queue must wait to expire before the placeholder packet is eligible for transmission on the wireless medium.

At block 315, the RoCE manager determines whether RoCE data has been received. The RoCE manager may be waiting for RoCE data that is received from an external device—e.g., a server coupled via a wireless connection to the AP—or for the RoCE data to be received from an internal component such as a network card, a DMA controller, and the like.

If the RoCE data is received, the method 300 proceeds to block 320 where the RoCE manager inserts the RoCE data into the payload of the placeholder frame. In one embodiment, the RoCE manager may also update the header of the placeholder frame—e.g., set the destination for the frame since this might not be known until receiving the RoCE data. Once the placeholder frame has been updated, the frame can now be thought of as a RoCE frame rather than a placeholder or shadow frame. The RoCE frame can now be transmitted to its destination.

At block 325, the transmission queue determines whether the slot count is expired. Put differently, the transmission queue determines whether the contention process is complete and the placeholder packet can be transmitted on the wireless medium. If not (or if there is a contention where another, higher priority frame is attempting to be sent at the same time), the method 300 remains at block 325 until the slot count has expired and the contention process is complete.

Once the contention process is complete, at block 330, the AP or user device wirelessly transmits the placeholder frame as a RoCE frame to its destination.

However, returning to block 315, if the RoCE data has not yet been received, the method 300 proceeds to block 335 where the transmission queue determines whether the slot count has expired. In other words, the transmission queue determines whether the contention process is complete. If not, the method 300 returns to block 315 to wait for the RoCE data to be received.

If, however, the slot count has expired and the RoCE data has not been received, at block 340 the transmission queue determines whether other frames are waiting. For example, other data frames in the queue may have expired slot counts and are waiting for the placeholder frame to be transmitted before they are eligible to be transmitted. Put differently, the transmission queue determines whether the placeholder frame is blocking other data frames in the queue from being transmitted. If so, the method proceeds to block 345 where the transmission queue or the RoCE manager drops the placeholder frame from the queue. Put differently, the placeholder frame is removed from the frame which may free up other data frames for transmission.

However, assuming the placeholder frame is not blocking other frames in the queue at block 340, the method 300 may permit the placeholder frame to stay in the transmission queue (even though the contention process is satisfied) and return to block 315 to wait for the RoCE data.

Figure 4:
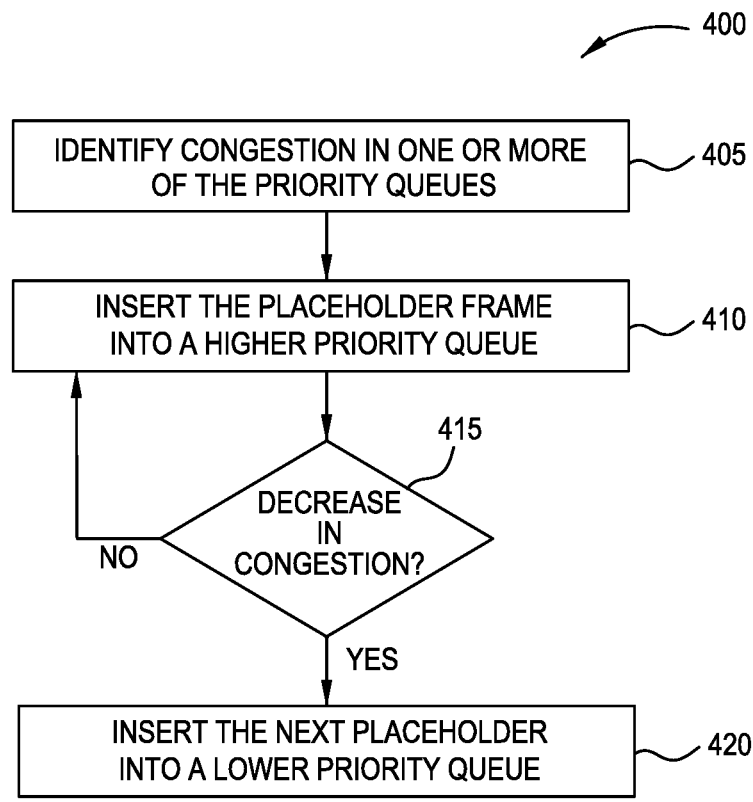
FIG. 4 is a flowchart for inserting a placeholder frame into a priority queue in response to congestion, according to one embodiment described herein.

FIG. 4 is a flowchart of a method 400 for inserting a placeholder frame into a priority queue in response to congestion, according to one embodiment described herein. In one embodiment, the method 400 illustrates various techniques for performing block 305 in the method 300.

At block 405, the RoCE manager identifies congestion in one or more of the transmission queues. For example, congestion can be measured by the number of data frames in the queues or the number of collisions during the contention process where slot counts for multiple data frames expire at the same time. When there is congestion, it may make it harder for the RoCE manager to ensure that the RoCE frames are transmitted within a maximum time window. Put differently, congestion can reduce the determinism corresponding to transmitting RoCE data.

To improve achieve higher predictability when congestion occurs, at block 410, the RoCE manager inserts the placeholder frame into a higher priority queue. That is, before identifying the congestion, the RoCE manager may insert the placeholder frame into a lower priority transmission queue (e.g., AC_BE). However, after identifying congestion, the manager inserts the placeholder frames into a higher priority queue (e.g., AC_VI). As mentioned above, inserting the placeholder frame in the higher priority queue may reduce, on average, the slot count which generally decreases the time the placeholder frame waits before being transmitted. If congestion continues to increase, the RoCE manager may continue to insert the placeholder frames into higher priority queues to maintain or achieve higher predictability corresponding to transmitting RoCE data.

At block 415, the RoCE manager determines if the congestion begins to decrease. If not, the method 400 returns to block 410 and continues to use the higher priority queue to insert the placeholder frame. However, if the congestion is reduced, the method 400 proceeds to block 420 where the RoCE manager inserts the next placeholder frame into a lower priority queue. For example, the RoCE manager may insert the next placeholder frame into the queue used before the congestion was detected. Thus, using the method 400, the RoCE manager can dynamically respond to congestion in the AP or user device so the predictability for transmitting the RoCE traffic is maintained (or only slightly impacted) as wireless congestion increases.

Figure 5:
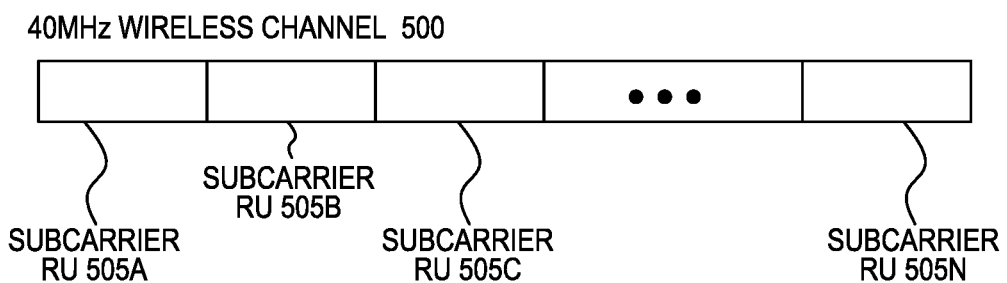
FIG. 5 illustrates subcarrier resource units in a Wi-Fi channel, according to one embodiment described herein.

FIG. 5 illustrates subcarrier resource units in a wireless channel, according to one embodiment described herein. In this example, FIG. 5 illustrates a 40 MHz wireless Channel 500 (e.g., a Wi-Fi channel) which may be part of a larger frequency band—e.g., a 2.4 GHz or 5 GHz frequency bands. That is, the channel 500 may be one of a plurality of channels in a frequency band.

The channel 500 is subdivided into a set of subcarriers. IEEE 802.11ax uses orthogonal frequency-division multiple access (OFDMA) and assigns one or more subcarrier RUs 505 for a transmission. Using OFDMA, different network or user devices can be assigned different subcarrier RUs 505 to transmit data. Thus, the subcarrier RU 505A can be assigned to a first device, the subcarrier RU 505B can be assigned to a second device, and so forth. In addition, the same device can be assigned multiple RUs in the same channel 500. For example, a first user device may be assigned the subcarrier RUs 505A and 505C while a second user device is assigned the subcarrier RUs 505B and 505N.

With dual carrier modulation (DCM), a user device can send a duplicate copy of individual messages on frequencies that are distant from one another to limit the effects of frequency sensitive interferences such as narrowband co-channel and multipath interferences. For example, to improve redundancy when transmitting an RoCE frame, a user device or AP may wirelessly transmit the same RoCE frame on both the subcarrier RU 505A and the subcarrier 505N in parallel. Because the subcarrier RU 505A and 505N are non-contiguous—e.g., there is at least one other subcarrier RU between the RUs—the likelihood that the same narrowband co-channel or multiple interference source negatively impacts both of the RoCE frames is reduced relative to transmitting the same frame on two adjacent subcarrier RUs 505 in the channel 500. While transmitting duplicate frames on non-contiguous RUs in the channel 500 improves redundancy, as discussed below, using a coding scheme can provide redundancy while reducing the amount of RUs 505 needed.

Figure 6:
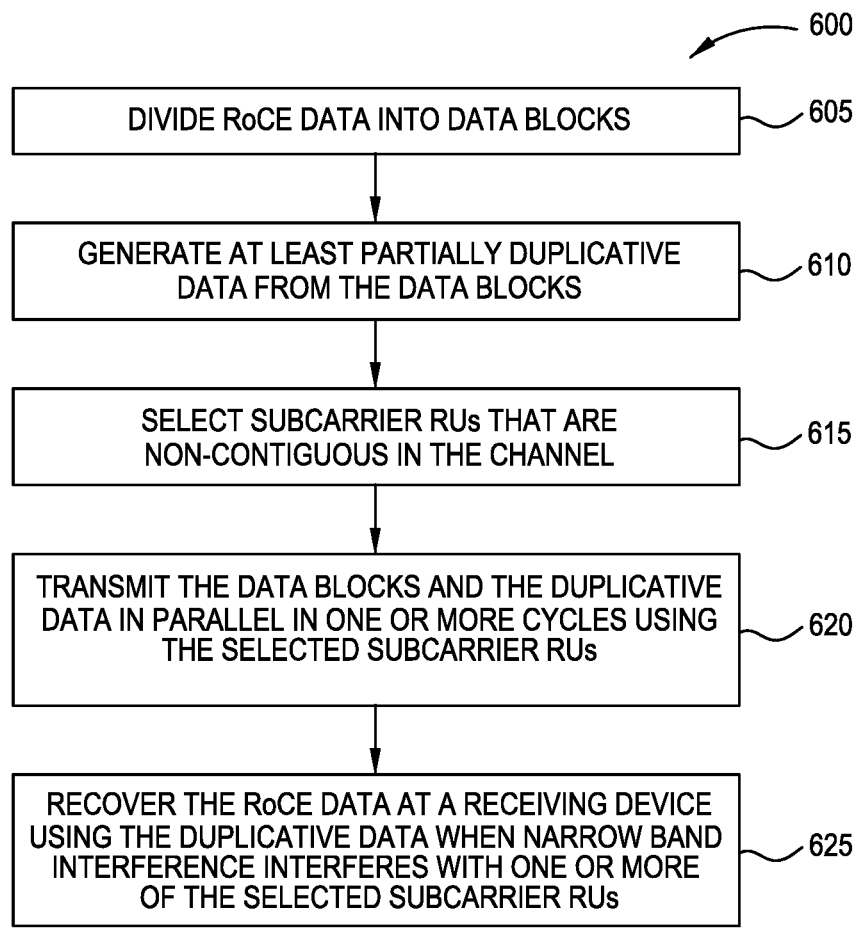
FIG. 6 is a flowchart for transmitting duplicative RoCE data using multiple subcarrier resource units, according to one embodiment described herein.

FIG. 6 is a flowchart of a method 600 for transmitting duplicative RoCE data using multiple subcarrier resource units, according to one embodiment described herein. At block 605, the RoCE manager splits a RoCE packet into data blocks. For example, if the RoCE packet is N-bytes, the RoCE manager can split the packet into 4 data blocks (or fragments) with an equal size of N/4. In one embodiment, each of the data blocks may be sent on a different subcarrier in a Wi-Fi channel (e.g., four different subcarrier RUs) using DCM.

At block 610, the RoCE manager generates at least partially duplicative data from the data block using a coding scheme. As an example, if there are two data blocks, Block A and Block B, the partially duplicative data may be formed from XORing the data in Block A and Block B. This redundant data can be transmitted in parallel with Block A and Block B. For example, the redundant data can be transmitted in a separate subcarrier RU from the RUs transmitting Block A and Block B.

So long as any two of the data blocks are received, the data in Block A and Block B can be recovered. For example, if the subcarrier RU transmitting Block A or Block B is blocked by interference (e.g., the data block is not received at the destination), the missing data can nonetheless be recovered from the data block that was received and the partially duplicative data (i.e., the redundant data) formed using the XOR coding scheme. While the XOR coding scheme is specifically mentioned, the embodiments herein can be used with any coding scheme that can generate partially duplicative or redundant data that can be used to recover the original data blocks in the event of a transmission failure.

In one embodiment, the coding scheme may use an N+1 redundancy where N is the number of data blocks transmitted in parallel and the +1 represents an additional subcarrier RU used to carry the redundant data formed by the coding scheme. However, in other embodiments, the coding scheme may provide N+2 or N+3 redundancy. Increasing the number of subcarrier RUs that transmit partially duplicative/redundant data increases the redundancy of the RoCE transmission so that if multiple data blocks are not received (e.g., interference prevents the destination device from receiving data on multiple subcarrier RUs), the original N data block can nonetheless be recovered. In this manner, each of the data blocks and each the redundant data can be assigned a respective subcarrier RU so the data can be transmitted in parallel.

At block 615, the RoCE manager selects (or negotiates for) subcarrier RUs that are non-contiguous in the Wi-Fi channel to transmit the N data blocks and the redundant data. Using non-contiguous subcarrier RUs limits the impact of narrowband co-channel interference on receiving the data as discussed above. For example, depending on the number of user devices using the channel, The RoCE manage may request that the subcarrier RUs be spread out equally across the channel.

At block 620, the wireless device (e.g., an AP or user device) transmits the data blocks and the duplicative data in parallel in one or more cycles using the selected subcarrier RUs. For example, the method 600 can be combined with the methods 300 and 400 where the data blocks and partially duplicative data are inserted into the payload of a placeholder frame that has already been inserted into a transmission queue, thereby reducing the wait time relative to inserting the frame into the transmission queue after the RoCE data has been received and blocks 605-615 have been performed.

At block 625, the receiving wireless device recovers the RoCE packet using the duplicative data when narrow band interference interferes with one or more of the selected subcarrier RUs. That is, if the code scheme uses N+1 redundancy, the system can tolerate failing to receive data on one of the subcarrier RUs and still recover all the original data blocks generated at block 605. However, if the system fails to receive data on multiple subcarrier RUs, the receiving device may request that the transmitting device resend the data. Using more redundant code schemes (e.g., N+2 or N+3 redundancy) represents a tradeoff between the chance that interference prevents the receiving device from recovering the data and the number of subcarrier RUs (e.g., the amount of bandwidth) of the channel used for transmitting RoCE data.

In one embodiment, if the channel has plenty of free subcarrier RUs (e.g., data contention is low), the RoCE manager may use a more redundant coding scheme. However, if there is a lot of competition for the subcarrier RUs, the RoCE manager may use a less redundant coding scheme.

Figure 7:
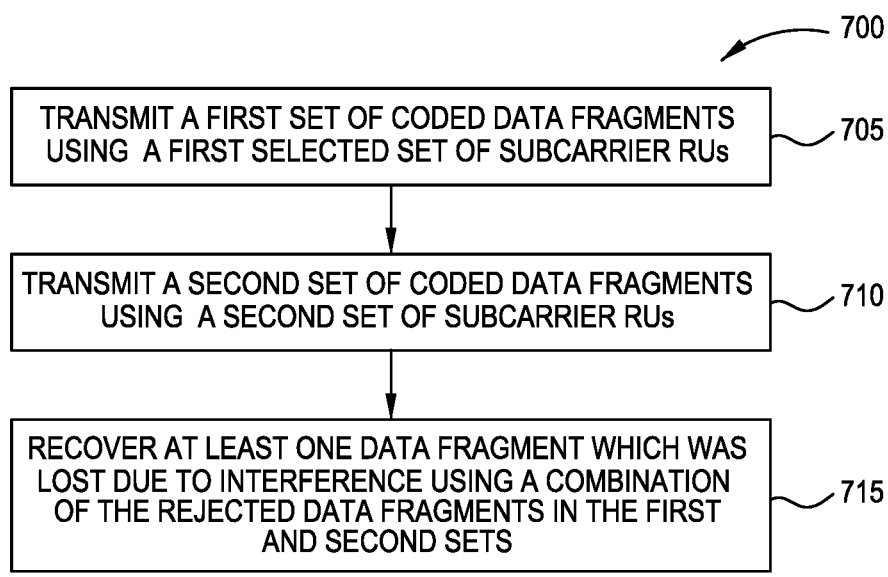
FIG. 7 is a flowchart for transmitting coded RoCE data using different subcarrier resource units over multiple cycles, according to one embodiment described herein.

FIG. 7 is a flowchart of a method 700 for transmitting coded RoCE data using different subcarrier RUs over multiple cycles, according to one embodiment described herein. At block 705, the RoCE manager instructs the wireless device to transmit a first set of coded data fragments using a first selected set of subcarrier RUs. For example, the first selected set of subcarrier RUs may be non-contiguous. Further, the wireless device may transmit the first set of coded data fragments in parallel.

At block 710, the RoCE manager instructs the wireless device to transmit a second set of coded data fragments using a second set of subcarrier RUs different from the first set of subcarrier RUs. That is, the first set of coded data fragments are transmitted at Time 1 using a different set of subcarrier RUs than the second set of coded data fragments transmitted at Time 2 (which is different than Time 1). Using FIG. 5 as an example, at block 705, the wireless device may use subcarrier RUs 505A, 505C, and 505E but at block 710, the wireless device uses subcarrier RUs 505B, 505D and 505F. One advantage of doing so is that any narrowband interference that blocks one or more subcarrier RUs at Time 1 may not affect the coded data transmitted at Time 2, and vice versa. Thus, switching the selected set of subcarrier RUs for different time periods can avoid the narrowband interference.

In addition to switching the subcarrier RUs over time, a coding scheme can be used to process the original RoCE data so that the first set of coded data can be used to recover lost data from the second set of coded data, and vice versa. That is, the coding scheme can process the received RoCE data to generate the first and second sets of coded data so that the sets of data can be used in post processing at the receiving device to recover the original RoCE data.

At block 715, the receiving device recovers at least one data fragment which was lost due to interference using a combination of the received data fragments in the first and second sets. For example, when transmitting the first set of coded fragments, the receiving device may receive data on three of the five subcarrier RUs being used due to interference. When transmitting the second set of coded fragments, the receiving device may receive data on four of the five subcarrier RUs. The receiving device can nonetheless combine the received data fragments to recover the original RoCE data used to generate both the first and second sets of coded data fragments. In this manner, a coding scheme can be used to transmit coded data fragments or data blocks during multiple time periods and using different sets of subcarrier RUs to improve the redundancy of wireless RoCE transmission.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product.

Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A wireless device, comprising:
a transmission queue configured to store a plurality of frames for transmission using a wireless medium; and
a remote direct memory access (RDMA) over a Converged Ethernet (RoCE) manager configured to:
preemptively insert a placeholder frame into the transmission queue,
instruct the transmission queue to start a contention countdown corresponding to the placeholder frame, and
upon receiving RoCE data, insert the RoCE data into the placeholder frame, wherein the contention countdown has already started.

2. The wireless device of claim 1, wherein inserting the RoCE data into the placeholder frame comprises:
inserting the RoCE data as a payload of the placeholder frame, wherein the payload of the placeholder frame was previously empty.

3. The wireless device of claim 1, wherein the wireless device is configured to wirelessly transmit the placeholder frame after the RoCE data has been inserted into the placeholder frame and the contention countdown has expired.

4. The wireless device of claim 1, further comprising:
a plurality of transmission queues each associated with a different priority traffic, wherein the RoCE manager is configured to:
determine that wireless congestion corresponding to the wireless device has increased, and
insert a second placeholder frame into a higher priority queue in the plurality of transmission queues than the transmission queue in which the placeholder frame was inserted.

5. The wireless device of claim 4, wherein the RoCE manager is configured to:
determine that wireless congestion corresponding to the wireless device has decreased, and
insert a third placeholder frame into a lower priority queue in the plurality of transmission queues than the higher priority queue in which the second placeholder frame was inserted.

6. The wireless device of claim 1, wherein the RoCE manager is configured to:
divide received RoCE data into data blocks;
generate at least partially duplicate data from the data blocks;
select subcarrier resource units (RUs) that are non-contiguous in a channel of the wireless medium, wherein at least one of the selected subcarrier RUs is used to transmit the placeholder frame; and
transmit, in parallel, the data blocks and the at least partially duplicative data from the data blocks using the selected subcarrier RUs in parallel, wherein the at least partially duplicative data permits a receiving device to recover the data blocks when at least one of the selected subcarrier RUs is blocked by interference.

7. The wireless device of claim 1, wherein the RoCE manager is configured to:
generate, using a coding scheme, a first set of coded data fragments and a second set of coded data fragments from received RoCE data;
transmit the first set of coded data fragments at a first time period using a first subset of subcarrier RUs in a channel of the wireless medium, wherein at least one of the first subset of subcarrier RUs is used to transmit the placeholder frame; and
transmit the second set of coded data fragments at a second time period different from the first time period using a second subset of subcarrier RUs in the channel of the wireless medium, wherein the second set of coded data fragments permits a receiving device to recover the received RoCE data when at least one of the first subset of subcarrier RUs used to transmit the first set of coded data fragments is blocked by interference.

8. The wireless device of claim 7, wherein the each of the first subset of subcarrier RUs is different from each of the second subset of subcarrier RUs.

9. A computing system, comprising:
a transmission queue configured to store a plurality of frames for transmission using a wireless medium;
a processor; and
memory configured to store a program that performs an operation, the operation comprising:
preemptively inserting a placeholder frame into the transmission queue,
instructing the transmission queue to start a contention countdown corresponding to the placeholder frame, and
upon receiving RoCE data, inserting the RoCE data into the placeholder frame, wherein the contention countdown has already been started.

10. The computing system of claim 9, wherein inserting the RoCE data into the placeholder frame comprises:
inserting the RoCE data as a payload of the placeholder frame, wherein the payload of the placeholder frame was previously empty.

11. The computing system of claim 9, wherein the operation further comprises:
wirelessly transmitting the placeholder frame after the RoCE data has been inserted into the placeholder frame and the contention countdown has expired.

12. The computing system of claim 9, further comprising:
a plurality of transmission queues each associated with a different priority traffic, wherein the operation further comprises:
determining that wireless congestion corresponding to the wireless medium has increased, and
inserting a second placeholder frame into a higher priority queue in the plurality of transmission queues than the transmission queue in which the placeholder frame was inserted.

13. The computing system of claim 12, wherein the operation further comprises:
determining that wireless congestion corresponding to the wireless medium has decreased, and
preemptively inserting a third placeholder frame into a lower priority queue in the plurality of transmission queues than the higher priority queue in which the second placeholder frame was inserted.

14. The computing system of claim 9, wherein the operation further comprises:

dividing received RoCE data into data blocks;
generating at least partially duplicate data from the data blocks;
selecting subcarrier RUs that are non-contiguous in a channel of the wireless medium, wherein at least one of the selected subcarrier RUs is used to transmit the placeholder frame; and
transmitting, in parallel, the data blocks and the at least partially duplicative data from the data blocks using the selected subcarrier RUs in parallel, wherein the at least partially duplicative data permits a receiving device to recover the data blocks when at least one of the selected subcarrier RUs is blocked by interference.

15. The computing system of claim 9, wherein the operation further comprises:
generating, using a coding scheme, a first set of coded data fragments and a second set of coded data fragments from received RoCE data;
transmitting the first set of coded data fragments at a first time period using a first subset of subcarrier RUs in a channel of the wireless medium, wherein at least one of the first subset of subcarrier RUs is used to transmit the placeholder frame; and
transmitting the second set of coded data fragments at a second time period different from the first time period using a second subset of subcarrier RUs in the channel of the wireless medium, wherein the second set of coded data fragments permits a receiving device to recover the received RoCE data when at least one of the first subset of subcarrier RUs used to transmit the first set of coded data fragments is blocked by interference.

16. A method comprising:
preemptively inserting a placeholder frame into a transmission queue that stores a plurality of frames for transmission using a wireless medium;
instructing the transmission queue to start a contention countdown corresponding to the placeholder frame; and
upon receiving RoCE data, inserting the RoCE data into the placeholder frame after the contention countdown has already been started.

17. The method of claim 16, further comprising:
wirelessly transmitting the placeholder frame after the RoCE data has been inserted into the placeholder frame and the contention countdown has expired.

18. The method of claim 16, further comprising:
determining that wireless congestion corresponding to a wireless device has increased; and
inserting a second placeholder frame into a higher priority queue in a plurality of transmission queues of the wireless device than the transmission queue in which the placeholder frame was inserted.

19. The method of claim 16, further comprising:
dividing received RoCE data into data blocks;
generating at least partially duplicate data from the data blocks;
selecting subcarrier resource units (RUs) that are non-contiguous in a channel of the wireless medium, wherein at least one of the selected subcarrier RUs is used to transmit the placeholder frame; and
transmitting, in parallel, the data blocks and the at least partially duplicative data from the data blocks using the selected subcarrier RUs in parallel, wherein the at least partially duplicative data permits a receiving device to recover the data blocks when at least one of the selected subcarrier RUs is blocked by interference.

20. The method of claim 16, further comprising:

generating, using a coding scheme, a first set of coded data fragments and a second set of coded data fragments from received RoCE data;

transmitting the first set of coded data fragments at a first time period using a first subset of subcarrier RUs in a channel of the wireless medium, wherein at least one of the first subset of subcarrier RUs is used to transmit the placeholder frame; and transmitting the second set of coded data fragments at a second time period different from the first time period using a second subset of subcarrier RUs in the channel of the wireless medium, wherein the second set of coded data fragments permits a receiving device to recover the received RoCE data when at least one of the first subset of subcarrier RUs used to transmit the first set of coded data fragments is blocked by interference.

* * * * *